April 4, 1944.  G. L. HASSLER  2,345,935
METHOD AND APPARATUS FOR PERMEABILITY MEASUREMENTS
Filed April 6, 1942  2 Sheets-Sheet 1

Inventor: Gerald L. Hassler
By his Attorney:

Inventor: Gerald L. Hassler
By His Attorney:

Patented Apr. 4, 1944

2,345,935

UNITED STATES PATENT OFFICE 2,345,935

METHOD AND APPARATUS FOR PERMEABILITY MEASUREMENTS

Gerald L. Hassler, Berkeley, Calif., assignor to Shell Development Company, San Francisco, Calif., a corporation of Delaware Application April 6, 1942, Serial No. 437,788

7 Claims. (Cl. 73—51)

This invention relates to the study and measurement of the flow of fluid or fluids through porous media, and pertains more particularly to an improved apparatus for measuring the effective permeabilities and capillary pressures of rocks, sands and other porous earth formations to the flow of fluids such as oil, water and gas.

A full knowledge and understanding of the effective permeability characteristics of partially saturated rocks or strata forming a mineral oil reservoir is essential to the solution of many important production engineering problems, such, for example, as evaluation of reserves, secondary recovery, pressure maintenance, etc.

It has now been found, however, that effective permeability measurements, if restricted to homogeneous flow conditions, and if effected as heretofore, while neglecting the effect of forces such as capillary pressure, yield incorrect results and may lead to erroneous conclusions as to the distribution of fluid phases and the actual magnitude of pressures prevailing in a given reservoir.

It is, therefore, an object of the invention to provide a method and an apparatus whereby the effective permeability of cores or other specimens of rocks, consolidated sands, etc., may be accurately measured under conditions of polyphase fluid flow.

It is also an object of this invention to provide a method and an apparatus whereby the effect of capillary forces may be accurately measured and separated from other effects involved in reservoir pressure measurements.

It is also an object of this invention to provide an apparatus whereby a liquid or capillary connection may be established between a liquid in a closed flow circuit of known capacity and a liquid in a porous specimen, and pressure and flow rate determinations may be effected by means of said connection.

It is also an object of this invention to provide for the above purposes a pressure measuring device operating with an extremely small volume displacement.

It is also an object of this invention to provide for the above purposes an apparatus having a membrane type or null indicator type manometer adapted to eliminate the excessively large time constant involved in the use of conventional manometers.

It is also an object of this invention to provide, for the purpose of maintaining a liquid circulation through a core whose permeability is being measured, an improved pump operating on the electrosmotic principle, whereby a constant rate of flow may be maintained through said core.

These and other objects of this invention will be understood from the following description taken with reference to the attached drawings, wherein:

Fig. 8 is a diagram of an arrangement, similar to that of Fig. 2, used for polyphase flow measurements.

The character of the pressure measurements effected by means of the present apparatus will be understood from the following brief discussion of the nature of the pressure differences occurring across the phase boundaries of oil, water and gas intermingled in a porous rock medium.

A non-wetting liquid, such, for example, as mercury with regard to glass, can be pressed against a porous glass medium without any penetration of the liquid into the pores. This is because the liquid, in entering any small hole, must be in the form of a small round head whose surface, being curved and effectively under tension ("surface tension"), tends to force it back out of the hole. Only the application of a considerable pressure, called the displacement pressure, will cause the mercury to displace the air from the porous medium and to pass therethrough. Air, on the other hand, passes freely through the pores of the glass. A porous glass plate may therefore be used as a valve which will permit air to pass, but will check the passage of mercury.

A similar condition obtains when a porous glass plate is completely saturated with water, and air is pressed against it. In this case, the small entering heads of air will be forced back since air cannot now, to use the same terminology, wet the glass as in the above air-mercury-glass system. If a mixture of air and water, as in a mist or froth, be pressed against such a water-wet porous septum, it will freely pass water but stop all air until the air pressure exceeds the displacement pressure of air against water for the particular septum. This displacement pressure, beyond which the wetted porous material will not discriminate sharply between wetting and non-wetting liquids, will be lower for coarse porous media and for low values of surface tension.

A water-wet porous septum will similarly exclude oil or any other non-wetting liquid, that is, a liquid which will not displace from any part of the solid surface any liquid already wetting said surface. A suitable choice of porous material can sometimes be found to separate any two liquids on the basis of their wetting characteristics.

According to the present invention, the displacement pressure phenomenon is used to measure separately the pressure of oil, water and gas during their flow through a core specimen.

Figure 1:
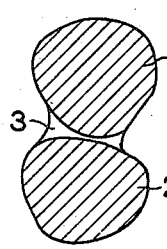
Fig. 1 is an enlarged idealized view showing two grains of sand held together by the capillary pressure obtaining within a pendular liquid mass wetting said grains.

Fig. 1 shows two separate sand grains 1 and 2 having a ring droplet or pendular mass 3 at the point of contact. Because the liquid wets the rock, it is stable only in a shape similar to that shown, in which the surface exerts an outward pull on the liquid and the latter is under suction. The existence of this suction is demonstrated by the fact that such wetted sand grains tend to adhere to each other, which adherence ceases whenever the grains are immersed in a single phase, that is, whenever they are either completely dry or immersed in the wetting liquid.

The pressure difference between adjacent points separated by the air-water interface is defined as the capillary pressure for air and water. This capillary pressure increases inversely as the size of the drop because of the decrease of the radius of curvature of the liquid, high pressure differences corresponding to highly curved liquid surfaces. For geometrical configurations other than that shown in Fig. 1, as in lines of contact along flat grain faces, narrow-necked capillaries, etc., there will be somewhat different relations between the quantity of liquid and the capillary pressure. In general, fine-textured rocks having small cemented grains and close packing will have a higher capillary pressure at equal saturation than coarse textured rocks with large grains, no cementation, and loose packing.

In most rocks, the wetting properties are sufficiently uniform to permit the establishment of a continuous web of liquid throughout the porous medium, so that the flow of the liquid results in producing equal pressures everywhere, in which case the term capillary pressure may be properly used in reference to the whole rock body.

A capillary connection between two porous specimens can be established by pressing between them a porous contact element made of material such as blotting paper, moist clay, plaster of Paris, etc. When so connected, water (or other liquid which wets the porous contact element) will flow between the specimens until they have equal capillary pressure. If such a connecting porous element has a sufficiently fine texture to resist the flow of air, that is, has a high displacement pressure, this element can be properly sealed to a tube to conduct said wetting liquid and used to make a connection between the three-dimensional mesh or web of water in the partially saturated rock and the liquid in the tube. Therefore, for all values of air-liquid pressure difference, that is, capillary pressure less than the displacement pressure of the contact piece which had been sealed, this arrangement can be used to measure the pressure of the water in the rock.

For the sake of clearness, an embodiment of the present apparatus adapted to determine the permeability and capillary pressure of a core under condition of a two-phase flow, for example, air and water, will be described first, and the arrangements necessary for three-phase or poly-phase measurements will be described subsequently.

Figure 2:
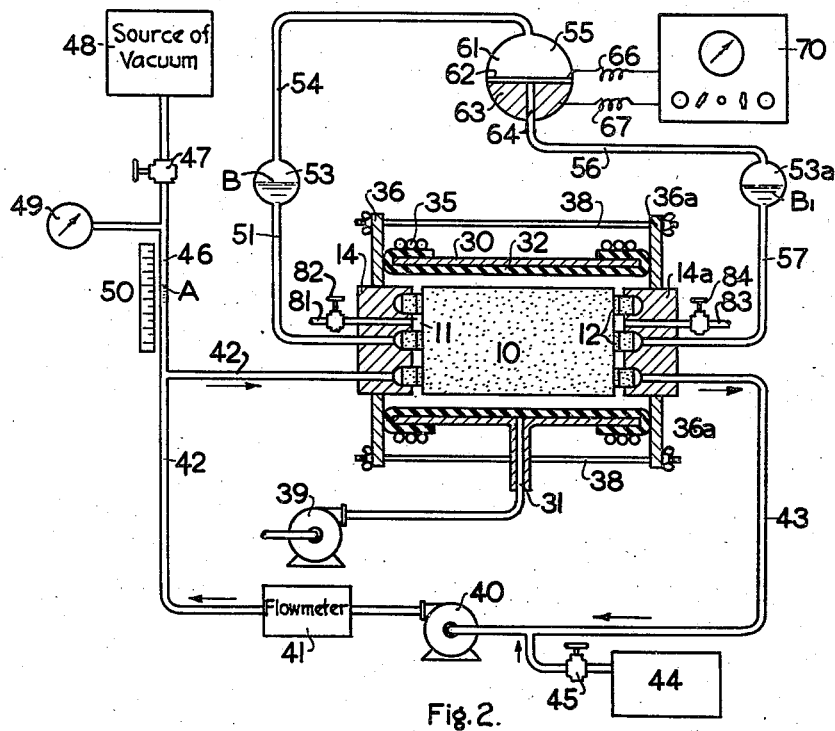
Fig. 2 is a diagram schematically showing the arrangement of apparatus used accordingly to this invention to measure the permeability and capillary pressure of a core sample under conditions of a two-phase flow.

Referring to Fig. 2, a core 10 is cut preferably to a cylindrical shape having substantially parallel faces 11 and 12. Pressed against faces 11 and 12 are contact elements 14 and 14a, shown in greater detail in Figs. 3 and 4.

Figure 3:
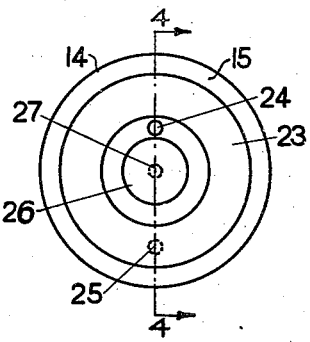
Fig. 3 is a face view of a contact element used in the arrangement of Fig. 2.
Figure 4:
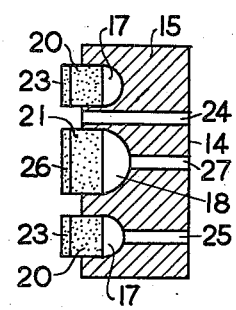
Fig. 4 is a cross-section view taken along line IV—IV of Fig. 3.

Referring to Figs. 3 and 4, each contact element comprises a cylindrical body 15, made of a fluid-impervious material, such as a metal, glass, porcelain, Bakelite or any other suitable alloy or composition. The body 15 has formed therein an annular groove 17 and a central circular cavity 18. Partially inserted in the groove 17 and held therein so as to protrude therefrom is a ring 20, made of a porous material chosen preferably so as to have a displacement pressure greater than that of the specimen 10 being measured, such as pressed porous graphite, clay, plaster of Paris, etc. A disc 21, made of similar material, is inserted and held in the same manner in the central cavity 18.

A channel 24 is bored through the body 15 between the front and the rear faces thereof. Channel 25 is bored through the body 15 between the annular groove 17 and the rear face of the body 15, and a similar channel 27 is likewise provided for the central cavity 18. Channels 24, 25 and 27 are in communication with suitable conduits, as will be explained hereinbelow.

In order to provide an improved contact between the core 10 and the face of ring 20 and of disc 21 which are pressed thereagainst, said faces may be provided with a special yieldable porous lining, as shown at 23 and 26, such as a thickness of blotting paper, or a layer of clay formed, for example, by immersing the contact element 14 into a clay suspension and applying suction through conduits 25 and 27, whereby a porous clay filter cake is formed on the faces of ring 20 and disc 24. This yieldable cake is pressed against the faces 11 and 12 of core 10 when said core is mounted into the present apparatus for the purpose of measurements, thereby giving an improved area of contact.

With the contact elements 14 and 14a pressed thereagainst, the core 10 is mounted in a tubular holder comprising a hollow metallic cylinder 30, provided with an orifice 31, and an elastic, fluid-tight inside lining 32, made of a material such, for example, as gooch rubber. The rubber lining is stretched and turned over the edges of the cylinder 30, being held in position, for example, by outside clamps or wire wrappings, as shown at 35.

End plates 36 and 36a, fitting closely about the body portions 15 of elements 14 and 14a, are tightened together by means of bolts 38, whereby the rubber lining is tightly pressed between said plates and the ends of the cylinder 30. If air under pressure, for example, from a pump 39, is then applied, through orifice 31, to the space between the inner wall of the cylinder 30 and the rubber lining 32, said lining will be pressed closely against the end plates 36, elements 14 and core 10, thereby entirely sealing the contact elements 14 and the core 10 against any fluid flow or interchange with the outside, except that provided for through the contact elements 14, as will be described hereinbelow.

The circulation of a liquid phase, for example, water, through the core is provided for by means of a closed circuit comprising a pump 40, a flow meter 41, a pipe 42, channel 25 and porous ring 20 in element 14, core 10, porous ring 20 and channel 25 in element 14a, and pipe 43 back to the intake of the pump 40. Liquid for this circuit is supplied from a reservoir 44, which may be shut off by means of a stopcock 45 when a measured amount of the liquid sufficient to give a desired saturation of the core has been admitted to the circuit.

Although any suitable type of pump, such as a centrifugal pump, may be used at 40, it may be especially advantageous for the purposes of this invention to use a pump operating on the electrosmotic principle.

Figure 9:
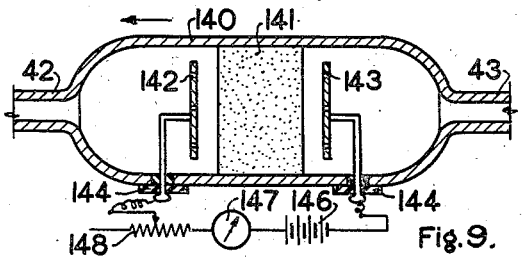
Fig. 9 is a diagrammatic cross-section view of an electrosmotic pump used to circulate the liquid in the closed-flow circuits of Figs. 2 and 8.

As schematically shown in Fig. 9, such a pump comprises a porous body 141, such as a plug made of clay or other suitable material, forming a porous diaphragm in an enlarged portion 140 of the pipe 42 or 43 of Fig. 2.

Electrodes such, for example, as circular plates 142 and 143, are mounted parallel to and at some distance from the faces of the plug 141 on either side thereof. To permit free flow of fluid through the casing 140, these plates are of a diameter somewhat smaller than the inside diameter of said casing 140, and may be perforated. Electrodes 142 and 143 are mounted in the casing 140 by means of electrically insulated bushings 144, and are electrically connected respectively to the positive and negative terminals of an electrical circuit comprising a source of current 146, an indicating device 147, such as an ammeter, and a rheostat 148. By impressing between electrodes 142 and 143 a potential difference whose magnitude is controlled by the rheostat or variable resistance 148, an electrosmotic liquid flow is induced within the porous body 141 from the negative to the positive electrode, whereby the whole of the liquid medium in the liquid circuit 42—10—43 of Fig. 2 is caused to flow in the direction shown by the arrow in Fig. 9.

Especially favorable flow conditions may be obtained if the porous body 141 is made of a material such as pressed aluminum oxide powder, while the electrodes 142 and 143 comprise a metal such as thallium, a thallium salt being likewise dissolved in the liquid circulating through the pump.

This arrangement possesses the advantages of giving an extremely constant rate of flow, and of permitting a very accurate measurement of said rate of flow through a proper calibration of the ammeter or indicating device 147, whereby the flow meter 41 of Fig. 2 may be dispensed with.

Referring further to Fig. 2, a pipe 46, preferably made of glass or having a glass portion, branches off from pipe 42, and is in communication with a source of vacuum 48, and a vacuum gauge 49. By applying and regulating, by means of a valve 47, a desired degree of vacuum to the liquid circuit, the liquid level A in pipe 46 may be caused to rise or to recede, thereby varying at will the amount of liquid held within the core, or in other words, the degree of saturation thereof. The level A in the glass pipe 46 may be accurately measured by means such as diagrammatically indicated in the form of a scale 50 in Fig. 2.

In order to measure the pressure necessary to drive the liquid through the core 10, or in other words, the pressure drop occurring in the core between the faces 11 and 12 thereof due to the flow of the liquid through the core, there is provided in the present apparatus a second liquid circuit adapted to measure said pressure difference without any substantial flow or transfer of liquid taking place in said second circuit.

This second circuit comprises the central porous disc 21 and channel 27 of the element 14, a pipe 51 provided, if desired, with an enlargement 53, a pipe 54, a manometer 55, a pipe 56 having an enlargement 53a, a pipe 57, and the channel 27 and disc 21 of element 14a.

Any desired type of manometer, such as a U-shaped manometer, may be used at 55. This manometer should have a very small displacement factor, for example, less than 1 mm.³/mm. of mercury for cores having a permeability of about 10 millidarcies. Since, however, a small time-constant, as well as a great sensitivity and accuracy, is desired for the present measurements, a type of diaphragm-condenser manometer, such as schematically shown in the drawings, should preferably be used.

The manometer 55 consists of a glass container 61, having a spherical or any other desired shape. A thin, flexible diaphragm 62, made of a suitable material such as quartz, is sealed to the inside walls of the container, dividing it into two fluid-tight portions. The upper portion of the container has an orifice in communication with the pipe 54, and the lower portion with the pipe 56. In making the manometer, the lower portion of the container is filled with a molten metal or alloy, such as Wood's metal, which is allowed to cool and to set within the container to a level parallel with and very close to the diaphragm 62. A channel 64 is drilled through the metal and is in communication at one end with the space between the metal 63 and the diaphragm 62, and at the other end with the pipe 56. The inside walls of the upper portion of container 61 and the upper face of diaphragm 62 are silvered or sprayed with any other suitable metal. Conductor wires 66 and 67 are fused through the walls of the container and are electrically connected to the silver layer on the diaphragm or container walls, and to the metal 63, respectively. It will be seen that the flexible diaphragm and the metal 63 thus form a variable condenser whose capacity is varied when a fluid pressure applied to the diaphragm from above causes said diaphragm to be deflected towards the metal. The wire 66 and 67 are connected to an electrical indicating device 70, which is adapted to indicate the capacity changes of the manometer-condenser 55. By properly calibrating the indicating device 70, the pressures applied to the diaphragm 62 may thus be accurately measured.

In order to apply to the diaphragm 62 the pressure drop occurring across the core 10 due to the flow of fluid in the first circuit (40—41—42—10—43), the manometer circuit must be completely filled with fluid. Since, however, it is obviously essential that the manometer-condenser 55 be filled with a non-conductive fluid, while the fluid flowing through the core may be an electrolyte such as brine or water, the manometer 55 (on both sides of the diaphragm) and the pipes 54 and 56 are filled with a non-conductive fluid such as castor oil, while the fluid filling pipes 51 and 57 is the same as that flowing through the core 10, for example, water or brine. The interfaces between the two liquids are shown at B and $B_1$ in enlargements 53 and 53a, respectively. This feature, obviously, may be dispensed with when the manometer circuit is used to measure the pressures of a non-conducting fluid, such as oil or gas.

Pipes 81 and 83 (Fig. 2) are in register and in communication with the channels 24 (Fig. 4) of the contact elements 14 and 14a. These pipes may be open or closed to the atmosphere or a source of pressure by means of stopcocks 82 and 84.

Pipes 81 and 83 may likewise be connected to flow and pressure measurement circuits, for example, if it is desired to measure the permeability of core 10 to gas flow under conditions of polyphase flow, as will be explained hereinbelow. These circuits are similar to those used for the liquid, and are therefore not shown in Fig. 2 in order not to complicate said figure unnecessarily. In view of the low resistances and small time-constants involved in the case of gas measurements, the flow and pressure circuits connected to pipes 81 and 83 may be connected with each other in the manner shown for the gas circuit 440—441—470 of the polyphase arrangement of Fig. 8.

The manner in which permeability and capillary pressure measurements may be effected by means of the present apparatus in cores for different degrees of saturation may be briefly outlined as follows:

The pore volume of the core is first measured in a manner well known in the art, and the core is saturated with a desired liquid to a desired degree or percent of saturation, for example, 100%.

The core is then mounted in the apparatus by pressing the contact pieces 14 and 14a thereagainst, introducing the core-contact pieces assembly within the cylinder 30, and applying gaseous pressure to the lining 32 from pump 39, whereby the core is sealed-in a fluid-tight manner from the outside by said lining.

A suction sufficiently small not to cause any displacement of fluid from the core is then applied by means of the source of vacuum 48 to remove any excess of liquid which may be present, for example, in the form of droplets at the connections, and the level A of the liquid in pipe 46 is noted by means of the scale 50, stopcock 45 being closed.

The liquid is then circulated through the core at a uniform rate by means of the pump 40, the flow rate being measured by means of the flowmeter 41, and the pressure drop obtaining across the core due to the flow of the liquid therethrough being measured by means of manometer 55 and indicating device 70.

Figure 5:
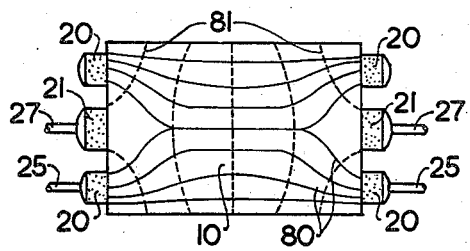
Fig. 5 is a diagram showing the lines of flow through a core during measurements effected with the present apparatus.

It will be seen that the liquid passing from the porous ring 20 of element 14 to the porous ring 20 of element 14a will flow in streams indicated in Fig. 5 by the solid lines 80, while the pressure drop due to this flow within the core will be distributed between zones indicated by the dotted lines 81, whereby said pressure drop may be measured by means of the circuit comprising the porous discs 21 and the manometer 55 without affecting the flow of the fluid through the core.

After the above measurements have been taken, a vacuum is applied to the flow circuit from source 48 by opening and suitably adjusting the valve 47, the degree of the vacuum applied being measured by the vacuum gauge 49.

This application of a vacuum will cause the liquid in pipe 46 to rise, its level being measured on the scale 50. The rise of liquid in pipe 46 will result in the withdrawal of a desired amount of liquid from the core and the flow circuit (stopcock 45 to reservoir 44 being closed), and will therefore cause a decrease in the saturation degree of the core, the place of the liquid within the core being taken by the air admitted through stopcocks 82 and 84.

After the saturation of the core has thus been reduced to a desired lower value, the measurements specified above may be repeated for said lower value, for example, a 75 percent saturation.

From the above measurements, the relative permeability of the core to a given liquid ($F_L$) at a given saturation may be readily computed from the formula:

$$F_L = \frac{u_s/dP_s}{u_{100}/dP_{100}}$$

wherein $u_s$ is the liquid flow rate as indicated by the flowmeter 41 for a given percent $s$ of saturation as indicated by the scale 50;

$u_{100}$ is the same flow rate for a 100 percent saturation;

$dP_s$ is the pressure difference across the core as indicated by device 70 for a given percent $s$ of saturation; and $dP_{100}$ is the same pressure difference for a 100 percent saturation.

Since the reading of gauge 49 gives the value of the vacuum which it is necessary to apply to draw a given amount of liquid from the core, it will be seen that gauge 49 actually indicates the capillary pressure of the core for a given saturation.

Thus, by obtaining values of flow rate, pressure drop and capillary pressure for different flow rates and degrees of saturation, and by computing from the formula given above the relative permeability of the core for these different values, a complete set of curves, such as capillary pressure against saturation, flow rate or pressure drop, relative permeability against saturation, etc., may be drawn from the readings of the present apparatus for a given core, and adequate information obtained as to the properties of the formation or reservoir of which said core is representative.

Although the present method provides a method whereby quantities proportional to the permeability and saturation of a given core averaged throughout its length can be measured, said average values cannot always be stated to be representative of true values, unless it is also known that the variations of saturation within the core are reasonably small, and that the relationship between the permeability and the saturation of the core is reasonably linear. However, by using a set of curves such as described above, and by comparing capillary pressure, average saturation and the average relative permeability curves, it is possible to detect and to correct for sharp variations of discontinuities.

In some cases, as especially when three fluid phases, for example, water, oil and gas are simultaneously present in the core, it is essential that the gaseous and the liquid permeabilities be measured together and in such way that the gas pressure gradient is equal to the pressure gradient of the flowing liquid. In such case, the capillary pressure being the same throughout the core, the saturation will also be the same, and no difficulties will arise from any possible variations therein.

Figure 7:
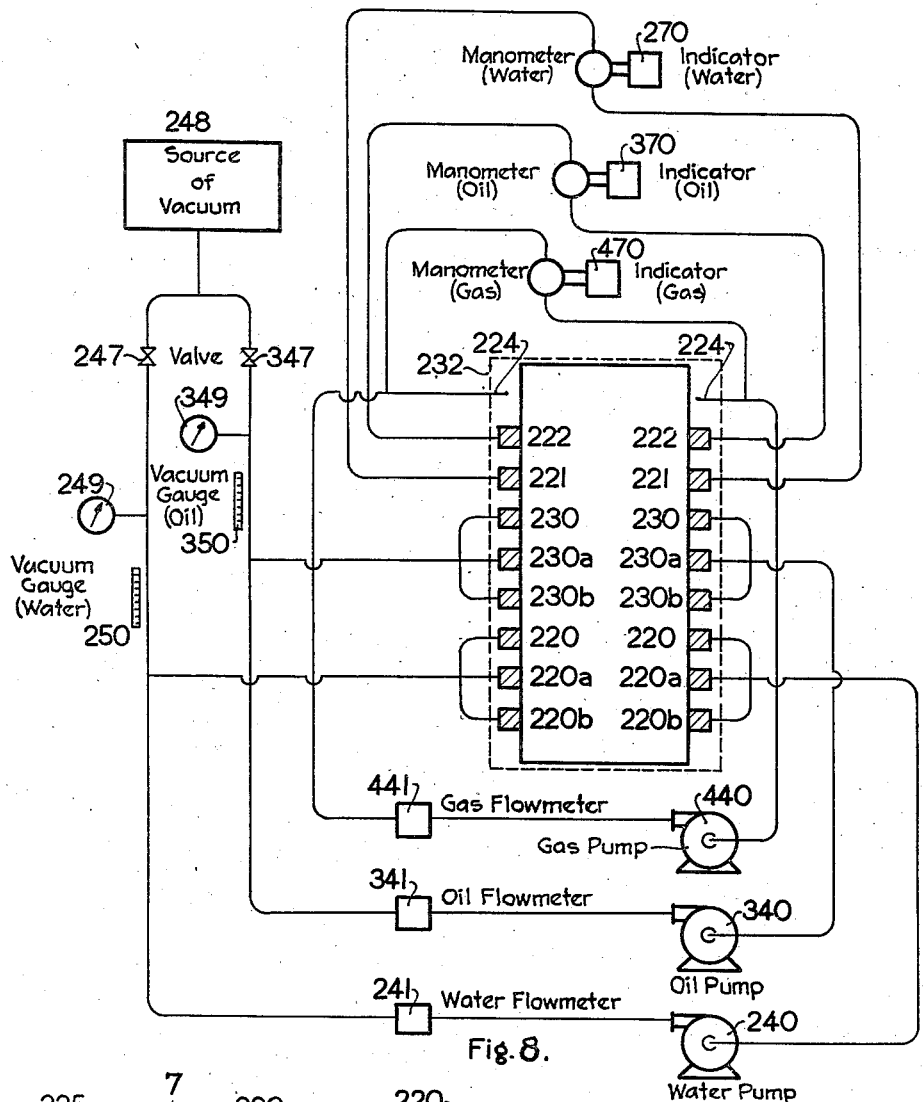
Fig. 7 is a cross-section view taken along line VII—VII of Fig. 5.
Figure 6:
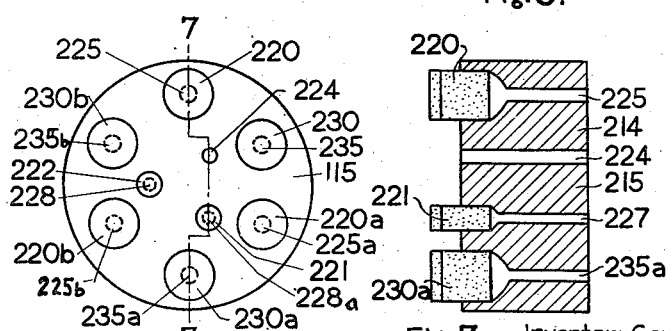
Fig. 6 is a face view of a contact element, used for polyphase flow measurements.

In order to permit the measurements described above to be effected under conditions of polyphase flow, for example, water, oil and air or gas, the present apparatus may be modified by replacing the contact elements 14 and 14a shown in Figs. 3 and 4 by elements 214 shown in Figs. 6, 7 and 8.

In these modified elements, the porous contact ring 20, used to force a fluid phase through the core, is replaced by any desired number of porous contact plugs, for example, 220, 220a and 220b, which are connected by channels 225, 225a and 225b, through the body 215 to a water flow circuit similar to that shown at 40—42—43 in Fig. 2 and serve to flow water through the core by means comprising a pump 240, flow meter 241, source of vacuum 248, valve 247, gauge 249 and scale 250. Plugs 230, 230a and 230b are connected, by channels 235, 235a and 235b, through the body 215 to a second liquid flow circuit comprising pump 340, flow meter 341, valve 347, gauge 349 and scale 350, whereby a second liquid, but non-aqueous medium, such as oil, may be circulated through the core simultaneously with water.

In order that the liquid phases simultaneously flowing through the core may separate and flow in their proper circuits after passing through said core, plugs 220, 220a and 220b are made of a material preferentially wetted by water, such as porous graphite or water hydrated silica, whereas plugs 230, 230a and 230b are made of a material preferentially wetted by oil such as porous molybdenum sulfide or tungsten sulfide. Similarly, the porous cake layers deposited on the faces of the plugs to improve their contact with the core, as described hereinabove, are initially saturated with water for plugs 220, 220a and 220b, and with oil for plugs 230, 230a and 230b to give them preferential wetting characteristics.

The central porous disc 21 of Figs. 3 and 4 is replaced by buttons 221 and 222, respectively, connected by channels 227 and 228 to a pressure drop indicating circuit similar to that shown at 51—54—55—56—57 in Fig. 2, whereby the pressure drops across the core may be separately and simultaneously measured for water by means of the manometer-indicator 270, and for oil by means of the manometer-indicator 370. Buttons 221 and 222 are formed and treated in the same manner as plugs 220 and 230, respectively, with regard to their preferential wetting properties.

The circulation and measurements of the gaseous phase, which is delivered to the faces of the core through channels 224, is effected by means of pump 440, flow meter 441 and manometer and indicator 470, the circulating and indicating circuits being conveniently combined as shown in the drawings in view of the low resistances and small time-constants involved.

The complete diagram of connections necessary for these polyphase measurements is schematically shown in Fig. 8, all structural details not shown therein being identical with those of Fig. 2, and the fluid-tight lining 31 of Fig. 2 being indicated by the dotted line 232.

I claim as my invention:

1. In a method for determining the permeability of a porous body to fluid flow, the steps of saturating said body with said fluid to a predetermined degree of saturation, circulating said fluid through said body in a closed circuit while maintaining said degree of saturation, measuring the rate of flow of said fluid, measuring the difference of pressure existing during said flow between points in said body spaced from each other in the direction of the line of flow of said fluid, changing the degree of saturation of said body, and repeating said flow and pressure measurements for said second degree of saturation.

2. In a method for determining the permeability of a porous body to fluid flow, the steps of establishing capillary connections between said body and a fluid flow circuit, flowing a fluid through said circuit and said body by means of said connections, measuring the rate of flow in said circuit, establishing capillary connections between said body and a second fluid circuit at points in said body spaced from each other in the direction of the fluid flow through said body, and measuring by means of said second circuit the difference in pressure existing between said points during the flow of the fluid through the first circuit.

3. In an apparatus for determining the permeability of a porous body to fluid flow, a set of porous elements adapted to be pressed into contact with said body on opposite sides thereof, a closed fluid-filled circuit in communication with said elements, means to circulate a fluid in said circuit, means to measure the rate of flow in said circuit, a second set of porous elements adapted to be pressed into contact with said body, the elements of said second set being spaced from each other in substantially the same manner as said first elements, a second closed fluid-filled circuit in communication with said second elements, and means in said second circuit for measuring the pressure drop occurring between said second elements when the fluid is circulated in the first circuit.

4. In an apparatus for determining the permeability of a porous body having two parallel faces to fluid flow, a set of porous annular elements adapted to be pressed into contact with said body on opposite sides and against the parallel faces thereof, a closed fluid-filled circuit in communication with said elements, means to circulate a fluid in said circuit, means to measure the rate of flow in said circuit, a second set of porous circular elements adapted to be pressed into contact with said body, the elements of said second set being arranged within the inner circumference of said annular elements and out of capillary contact therewith, a second closed fluid-filled circuit in communication with said second elements, and means in said second circuit for measuring the pressure drop occurring between said second elements when the fluid is circulated in the first circuit.

5. In an apparatus for determining the permeability of a porous body to fluid flow, a set of porous elements adapted to be pressed into contact with said body on opposite sides thereof, a closed fluid-filled circuit in communication with said elements, means to circulate a fluid in said circuit, means to measure the rate of flow in said circuit, a second set of porous elements adapted to be pressed into contact with said body, the elements of said second set being spaced from each other in substantially the same manner as said first elements, a second closed fluid-filled circuit in communication with said second elements, means in said second circuit for measuring the pressure drop occurring between said second elements when the fluid is circulated in the first circuit, means sealing said body and said first and second elements from the outside, means to withdraw a portion of the fluid of the first circuit from circulation in said circuit by applying a vacuum to said circuit, means for measuring the degree of vacuum applied, and means to measure the amount of fluid withdrawn from circulation.

6. In an apparatus for determining the permeability of a porous body to fluid flow under polyphase flow conditions, a plurality of porous elements adapted to be pressed into contact with said body on opposite sides thereof, means sealing the body and the contact elements from the outside, a plurality of closed flow circuits, each of said circuits being filled with a fluid phase immiscible with the phases of the other flow circuits, each of said circuits being in fluid communication with said body through at least one porous contact element on each side of said body, means to circulate a fluid through each of said circuits, means to measure the rate of flow of fluid in each of said circuits, a plurality of closed indicating circuits in fluid communication with said body through at least one porous contact element on each side of said body, and manometer means in each of said circuits for measuring the pressure drop occurring in the porous body for each phase when said phase is circulated therethrough concurrently with the other phases, the contact elements in each circuit being made of a material preferentially wettable by the particular phase flowing in said circuit.

7. In an apparatus for determining the permeability of a porous body to fluid flow, a closed fluid-filled circuit, spaced capillary contact elements in communication between said porous body and said circuit, means for circulating a fluid in said circuit, means for measuring the rate of flow in said circuit, means for controlling the quantity of the fluid circulating in said circuit through said porous body, a second closed fluid-filled circuit, second spaced capillary contact elements in communication between said porous body and said second circuit, and means for measuring the pressure drop occurring between said second contact elements when fluid is circulated in the first circuit.

GERALD L. HASSLER.